April 10, 1956
G. B. SAYRE
2,741,402
PLASTIC CONTAINER WITH WELDED SEAM
Filed March 10, 1950
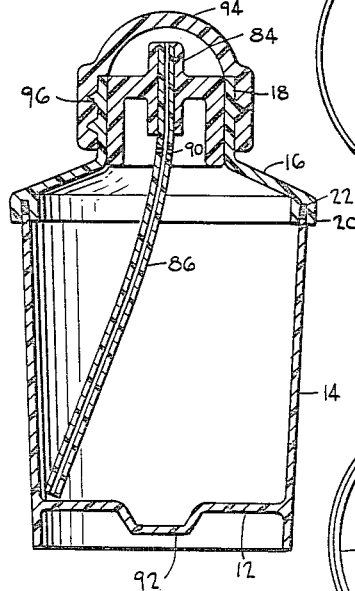
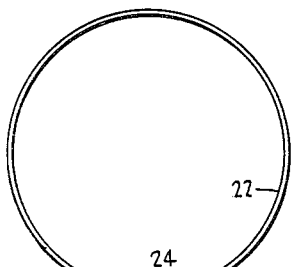
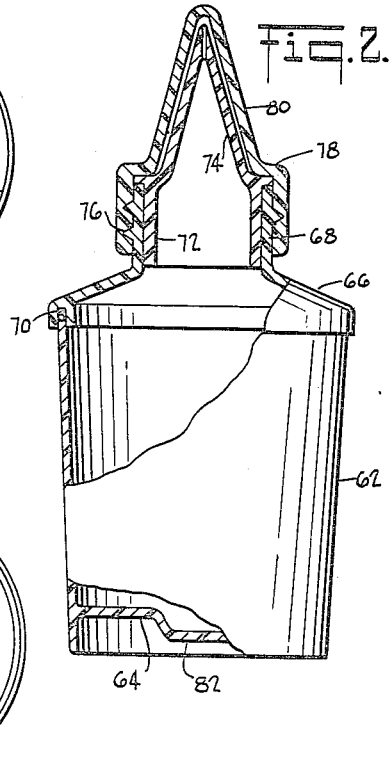
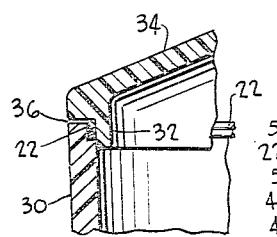
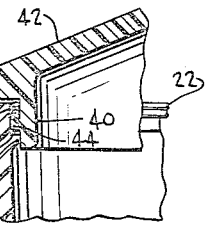
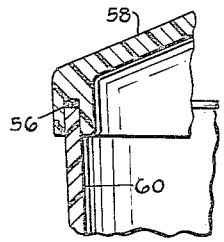
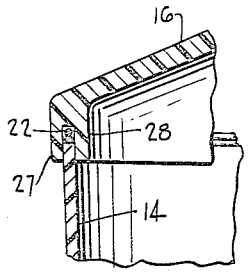
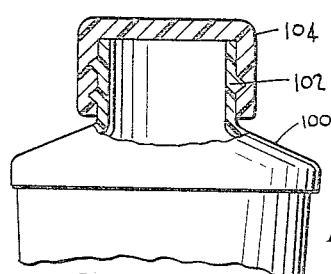
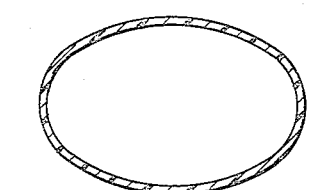
INVENTOR
GORDON B. SAYRE
BY *James and Franklin*
ATTORNEYS

# United States Patent Office 2,741,402
Patented Apr. 10, 1956

2,741,402

PLASTIC CONTAINER WITH WELDED SEAM

Gordon B. Sayre, Boonton, N. J., assignor, by mesne assignments, to Boonton Molding Company, a limited partnership Application March 10, 1950, Serial No. 148,884

13 Claims. (Cl. 222—215)

This invention relates to plastic containers, and more particularly to containers made of a plastic which is seamed by welding.

The primary object of the present invention is to generally improve plastic containers of the specified character. It has been suggested to mold a container in two parts, and to facilitate and localize the welding by embedding between the parts a closed or bonded iron ring made of wire of substantial diameter, the said ring later being subjected to induction heating. A more particular object of the present invention is to improve such containers.

A preferred plastic for the present purpose is Polyethylene. It is elastic and therefore results in a container or bottle which is unbreakable, in addition to being proof against attack by strong acids, alkalis, or other chemicals. Moreover, the material is elastic enough for the container to be squeezed, thus making it possible to use the same with either a squirt nozzle, or an atomizing or spray nozzle. A further object of the present invention is to improve such containers, and for that purpose I have found it possible to use a thin flexible wire for the welding operation, particularly if employed with several convolutions. I have further found that it is not necessary to bond or weld the ring, and instead an open-ended or unbonded ring may be employed, thus greatly decreasing the cost of manufacture of the ring, and the ease of applying it to the container parts.

Still further objects of the present invention are to provide a container or bottle which is to considerable extent non-leaky even with a defective seam, and which may be made of multiple colors, for improved appearance or as a symbol of the contents, or other purpose. With this object in view I provide a bottom and side wall which are molded in one piece, and a top and neck which are molded in one piece, these two pieces being joined by a seam located at the top of the side wall. Thus the seam is located above the contents, with little likelihood of leakage even with a defective seam. If the two parts are molded of different colors the colors are clearly visible because, unlike the separate bottom heretofore proposed, the parts of my container are both visible. There is no loss of compressibility of the container because the bottom may be pushed in for squirt or spray purposes, or the sides may be squeezed together below the top of the container, and even at the top of the container when using the thin flexible wire here recommended.

To accomplish the foregoing general objects, and other more specific objects which will hereinafter appear, my invention resides in the welded plastic container elements and their relation one to another as are hereinafter more particularly described in the following specification. The specification is accompanied by a drawing, in which:

Fig. 1 is a section through a container embodying features of my invention, and equipped with a spray nozzle;

Fig. 2 is a partially sectioned elevation through a container having a squirt nozzle;

Fig. 3 is a plan view of a ring embedded in the seam;

Fig. 4 is a side elevation of the ring;

Fig. 5 is a fragmentary section through the seam, before welding, drawn to enlarged scale;

Fig. 6 is a similar section showing a modification;

Fig. 7 is a similar section showing still another modification;

Fig. 8 is a plan view showing a modified form of helical ring;

Fig. 9 is a similar view showing a spiral ring;

Fig. 10 is a fragmentary section similar to Figs. 5, 6 and 7, but showing the spiral ring;

Fig. 11 is explanatory of a modification in which the container has an elliptical instead of circular section; and Fig. 12 is a fragmentary section similar to Figs. 1 and 2, but showing a modification in which the container has a simple screw cap, with no nozzle.

Referring to the drawing, and more particularly to Fig. 1, the container there shown comprises a bottom 12 and a side wall 14 molded in one piece, and a top 16 and a neck 18 molded in one piece, the said two pieces being joined by a seam 20 which is elevated well above the bottom 12 and which is preferably located at the very top of the side wall 14. A metal ring 22 is embedded in the plastic material at the seam, and the plastic material of the two parts of the container is welded around the ring 22. The plastic material may be any material which it is thought preferable to weld rather than to cement, the best known and preferred example being Polyethylene. This material is light in weight, extremely low in water absorption and moisture permeability, and has exceptional electrical properties. What is even more important for the present purpose, however, is that it is resistant to alkalis, acids, and oxygenated solvents. It is strong, tough, and elastic, resulting in a virtually unbreakable container which may be compressed. However, it is not feasible to make a cemented seam because the material is resistant to solvents (except some rare chemicals which are so extraordinarily volatile that they must be used under prohibitively high pressures).

The seam at 20 is accordingly a welded seam produced by fusing together the upper and lower parts at the seam. This is most readily and safely accomplished by inserting a metal ring in the seam and subjecting the assembly to induction heating, thus producing a localized heat at the ring.

In accordance with the present invention the ring itself is improved. A preferred form of ring is shown in Figs. 3 and 4. It consists of thin flexible ferrous material. It may be an ordinary, inexpensive steel wire. Multiple convolutions are preferably provided, two such convolutions being adequate, and preferably being arranged in super-position or helical formation, as will be clear from inspection of Figs. 3 and 4. The ends 24 and 26 of the ring 22 are preferably open or unbonded. This greatly reduces the cost of making the ring.

It has heretofore been suggested to employ a single loop of relatively heavy gauge wire, with the ends of the wire welded or bonded together to form an electrically closed ring. This introduces important disadvantages. One is the cost of the ring, and particularly the welding or bonding operation. Another is that a heavy ring requires a heavier plastic wall to conceal and embed the same. Still another is that the heavy ring is inflexible and makes its part of the container correspondingly rigid. Still another is that the groove or recess in the molded part receiving the ring, and the ring itself, have to be made with close tolerance in order to fit one another, and this in turn increases the cost of manufacture.

I have found that it is feasible to work with an open or unbonded ring, even with one convolution of wire. This greatly reduces manufacturing cost because it eliminates the welding or bonding of the ring, and makes it possible for the ring to yield or change dimension to fit the part on which it is placed. With such an open wire the heating depends on hysteresis rather than eddy current, but with high frequency induction heating this is readily done.

However, I have further found that there are many advantages in using a very fine gauge wire instead of a heavy wire. It is inexpensive, easy to form into a ring, easy to handle, easy to apply to the molded part, easy to embed in a thin wall, and it does not inhibit deformation or squeezing of the container. I have further found that an exceptionally thin wire may be employed if used in several convolutions, and when that is done I regain much of the advantage of the bonded or welded ring heretofore proposed, for the multiple convolutions contact one another and act electrically as a closed ring, even though the ring is unwelded or unbonded. Thus the ring may be heated by eddy current as well as by hysteresis.

The manner in which the helical ring is related to the plastic parts is better shown in Fig. 5, which is similar to one corner of Fig. 1 but drawn to enlarged scale. It represents the relation of the parts immediately prior to the welding operation. During the welding operation the material fuses and flows closely around the wire.

In the structures shown in Figs. 1 and 5 the seam is shouldered, that is, the top is formed with a groove between two walls 27 and 28 which enclose the ring 22 and the side wall 14 of the container. This makes a relatively strong seam which is simple to handle during manufacture. However, it is not essential, and Fig. 6 shows a modification which may be employed when it is desired to provide the container with a smooth exterior. In Fig. 6 the side wall 30 is received about an inside flange 32 depending from a top wall 34. The upper edge of wall 30 is recessed or stepped slightly to receive the ring 22. When the parts are put together there is preferably a slight initial spacing therebetween, somewhat as indicated at 36. This is closed during the welding operation because the top 34 settles, and indeed may be, and preferably is, subjected to a slight pressure during the welding operation.

Fig. 7 shows a further modification in which the flange 40 of top 42 is rigid or beaded somewhat at 44 so that the ring 22 may be sprung into position on the top piece and there safely held before the top is added to the side wall. The side wall 46 may, if desired, be provided with a small ledge or bead 48. The parts are preferably dimensioned to leave a slight spacing indicated at 50 before the welding operation. During the welding operation this space is closed and the parts are all fused together as previously described. It may be mentioned that it is an easy matter to provide ridges or beads such as are shown at 44 and 48 during the molding operation because the Polyethylene plastic is rubber-like and is readily sprung from the mold in which it has been formed, despite undercuts.

I have so far shown the ring in helical formation and have explained that one advantage of multiple convolutions is in forming an electrically closed ring. If desired, multiple contact between the convolutions may be insured by giving the convolutions a slightly sinusoidal or wavy shape. This is shown in Fig. 8 which is a view similar to Fig. 3 but showing the helical ring modified to be formed out of wire which has been preliminarily waved slightly. The waves are preferably so pitched relative to the circumference of the ring that they are out of registration in the superposed convolutions. Thus numerous points of crossover between an upper and a lower convolution are assured. In the drawing the wavy shape has been greatly exaggerated for clarity.

It is not essential that the multiple convolutions be arranged helically. Such an arrangement is shown in Fig. 9 of the drawing in which the inner and outer convolutions 52 and 54 lie in a single plane. The wire may be of such fine gauge that even when in spiral form the ring may have a dimension no greater than the thickness of the side wall, and in such case the ring may be employed as shown in Fig. 10, in which the ring 56 is disposed in a groove in top 58, which groove also receives the side wall 60 of the container.

Fig. 2 shows the application of the invention to a container used with a squirt nozzle. Thus it may be used as an oil can, or as a filler can for pocket lighters, etc. To a large extent the container is similar to that described in Fig. 1, it comprising a side wall 62 molded integrally with a bottom 64, and a top 66 molded integrally with a neck 68, these parts being secured together with the aid of a thin flexible ring 70. The neck has force-fitted therein the base portion 72 of a conical squirt nozzle 74. The outside of the neck is preferably provided with a thread indicated at 76, and the cap 78 is threaded to mate with the thread 76. The cap has a conical portion 80 which is dimensioned to receive and house the squirt nozzle 74. The bottom 64 may be provided with a button portion 82 which facilitates squeezing the bottom upwardly to eject some of the contents through the nozzle. However, it will be understood that the side walls may be squeezed together, instead of squeezing the bottom upwardly.

Reverting now to Fig. 1, the invention is there shown applied to a container adapted to spray or atomize its contents. For this purpose the neck portion 18 has force-fitted therein a nozzle portion 84. This has a hole through which a long slender tube 86 is forced. The tube is preferably made separately because it may be made economically as a continuous extruded tubing. It is pierced with a transverse hole at 90 immediately below the nozzle portion 84. This admits air when the container is squeezed, and the air flows upward through the tube and draws with it a small quantity of the liquid contents. This is blown out in atomized form. The tube 88 is preferably made of suitable length to reach the bottom of the container, and may, if desired, be shaped to extend to one corner of the container, as shown. It may also be run straight down to the bottom of the button or well 92. In such case, however, the container should be squeezed solely at the sides, whereas with the tube disposed as shown in the drawing, the container may be squeezed at either the sides or the bottom. It will be understood that the nozzle portion 84 and the extruded tube 88 are both preferably formed of the same Polyethylene plastic as the container, if the contents are to be of a type which attacks other plastics. The cap 94 is preferably internally threaded to mate with a thread 96 formed on the outside of neck 18. This cap protectively houses the spray nozzle and seals the contents against evaporation.

If desired the containers may be made elliptical in cross-section instead of circular. This is sometimes preferred in order to facilitate and encourage squeezing of the sides of the container. Such an arrangement is shown in horizontal section in Fig. 11, and it will be understood that the present invention is fully applicable to such construction, the essential difference being the provision of a metal ring which is elliptical in outline instead of circular. This is readily accomplished by winding the convolutions about an elliptical mandrel. Fig. 11 corresponds to a section taken about half way between the top and bottom of the container.

It is not essential that the container be used for spray or squirt purposes, or that the container be squeezed. The Polyethylene plastic referred to may be of great advantage for a container used as an ordinary bottle. The material may be advantageous either because the bottle is intended to carry a liquid which attacks other plastics, or because it is desired to make a bottle which is unbreakable even though subjected to strong abuse. Such an arrangement is shown in Fig. 12, in which it will be seen that the top 100 is formed with a neck 102, exactly as previously shown, and is closed by a threaded cap 104. Indeed it may be well to point out here that the structures shown in Figs. 1 and 2 contemplate the manufacture of the plain bottle shown in Fig. 12, and that it is primarily for this reason that the nozzle part 84 in Fig. 1 and the nozzle part 74 in Fig. 2 are made separately instead of being molded integrally with the top of the container. In other words, with the structures in the forms here shown the same mold may be employed for either the plain bottle shown in Fig. 12, or the spray bottle shown in Fig. 1, or the squirt bottle shown in Fig. 2. However, if a mold were being designed solely for use with a squirt nozzle it is evident that the nozzle 74 of Fig. 2 might be molded integrally with the neck and top. Similarly, if the bottle is to be used solely with a spray nozzle, it is evident that the nozzle 84 of Fig. 1 might be molded integrally with the neck and top. In Fig. 12 no gasket is shown, and in many cases none will be wanted, but it will be understood that one may be provided if wanted.

In one particular example of my invention the ring was made of slightly less than two full convolutions of a steel wire having a diameter of .015". The wall of the container was made of Polyethylene having a thickness of 1/32". It will be understood that these dimensions are given solely by way of example, and not in limitation of the invention. In the drawing, in general the thicknesses have been exaggerated for clarity.

It is believed that the construction and method of assembly of my improved welded plastic container, as well as the advantages thereof, will be apparent from the foregoing detailed description. If the top 16 and side wall 14 are made of different colors an attractive or striking appearance may be obtained because both colors are visible because of the high location of the seam. Moreover, there is little or no chance of leakage from even a container having a somewhat defective seam, because the seam is located above the liquid level. The metal ring is inexpensive and easily made because the ends are open or unbonded, yet the heating of the ring may arise from eddy current loss as well as hysteresis, because electrically the ring acts as a closed ring. Because the ring is an open ring and is made of thin wire, it is readily assembled on a bottle part or in a groove, despite some difference in dimension, and it is readily sprung over a bead or ledge. The ring may be made of such thin flexible wire that it is not only readily sealed and embedded in a thin wall, but also does not prevent deformation or squeezing of the container even at the ring itself. The structure may be employed for plastics which cannot be cemented, and for containers in which a difficult plastic such as Polyethylene is desired for any of a number of reasons, such as compressibility for spray or squirt purposes, or unbreakability, or resistance to attack by strong chemicals.

It will be apparent that while I have shown and described the invention in several preferred forms, changes may be made in the structures shown without departing from the scope of the invention, as sought to be defined in the following claims.

I claim:

1. A plastic container comprising a plurality of molded flexible parts made of a flexible plastic and permanently joined by a seam, and a metal wire flexible ring embedded in the plastic material at the seam, the plastic material at the seam being permanently heat welded together around, and with the aid of, the flexible wire ring.

2. A plastic container comprising a plurality of molded flexible parts made of a flexible plastic and permanently joined by a seam, and a metal flexible ring embedded in the plastic material at the seam, said ring being made of a plurality of convolutions of very thin flexible ferrous wire, the plastic material at the seam being permanently heat welded together around, and with the aid of, the flexible wire ring.

3. A plastic container comprising a plurality of molded flexible parts made of a flexible plastic and permanently joined by a seam, and a flexible metal wire ring embedded in the plastic material at the seam, said ring being open-ended or unbonded, the plastic material at the seam being permanently heat welded together around, and with the aid of, the flexible wire ring.

4. A polyethylene container comprising a plurality of molded flexible parts permanently joined by a seam, and a metal flexible ring embedded in the polyethylene material at the seam, the polyethylene material at the seam being permanently heat welded together around, and with the aid of, the flexible wire ring.

5. A plastic container comprising a flexible bottom and side wall molded of plastic in one piece, a flexible top and a neck molded of plastic in one piece, said two pieces being permanently joined by a seam elevated well above the bottom, a metal flexible ring embedded in the plastic material at the seam, said ring being made of flexible ferrous wire, and the plastic material at the seam being permanently heat welded together around, and with the aid of, the flexible wire ring.

6. A plastic container comprising a flexible bottom and side wall molded of plastic in one piece, a flexible top and a neck molded of plastic in one piece, said two pieces being permanently joined by a seam elevated well above the bottom, a metal flexible ring embedded in the plastic material at the seam, said ring comprising multiple convolutions of thin flexible wire, and the plastic material at the seam being permanently heat welded together around, and with the aid of, the flexible wire ring.

7. A plastic container comprising a flexible bottom and side wall molded of plastic in one piece, a flexible top and a neck molded of plastic in one piece, said two pieces being permanently joined by a seam elevated well above the bottom, a metal flexible wire ring embedded in the plastic material at the seam, the ends of said wire being open or unbonded, and the plastic material at the seam being permanently heat welded together around, and with the aid of, the flexible wire ring.

8. A polyethylene container comprising a flexible bottom and side wall molded in one piece, a flexible top and a neck molded in one piece, said two pieces being permanently joined by a seam at the top of the side wall, a metal flexible ring embedded in the polyethylene material at the seam, said ring being made of flexible ferrous wire, and the polyethylene material at the seam being permanently heat welded together around, and with the aid of, the flexible wire ring.

9. A polyethylene container comprising a flexible bottom and side wall molded in one piece, a flexible top and a neck molded in one piece, said two pieces being permanently joined by a seam at the top of the side wall, a metal flexible ring embedded in the polyethylene material at the seam, said ring comprising multiple convolutions of thin flexible wire, and the polyethylene material at the seam being permanently heat welded together around, and with the aid of, the flexible wire ring.

10. A polyethylene container comprising a flexible bottom and side wall molded in one piece, a flexible top and a neck molded in one piece, said two pieces being permanently joined by a seam at the top of the side wall, a metal flexible ring embedded in the polyethylene material at the seam, the ends of said ring being open or unbonded, and the polyethylene material at the seam being permanently heat welded together around, and with the aid of, the flexible wire ring.

11. A container as defined in claim 5, in which the neck is provided with a nozzle, and in which the container is elastically compressible.

12. A container as defined in claim 8, in which the container is provided with a nozzle, and in which the container is elastically compressible.

13. A container as defined in claim 5, in which the neck is provided with a nozzle, and in which the neck is externally threaded and is provided with an internally threaded cap dimensioned to receive and protectively house the nozzle, and in which the container is elastically compressible.

References Cited in the file of this patent

UNITED STATES PATENTS

| | | |
|---|---|---|
| 47,896 | Hart | May 23, 1865 |
| 235,584 | Speer | Dec. 14, 1880 |
| 562,763 | Froidevaux | June 23, 1896 |
| 854,792 | Bartlett | May 28, 1907 |
| 1,655,678 | Dorment | Jan. 10, 1928 |
| 2,176,109 | Ratay | Oct. 17, 1939 |
| 2,274,258 | Roselle | Feb. 24, 1942 |
| 2,290,348 | Moule | July 21, 1942 |
| 2,388,169 | McAlevy | Oct. 30, 1945 |
| 2,426,267 | Hart | Aug. 26, 1947 |
| 2,440,339 | Langer | Apr. 27, 1948 |
| 2,460,874 | Coberly | Feb. 8, 1949 |
| 2,487,400 | Tupper | Nov. 8, 1949 |
| 2,542,702 | Prow | May 20, 1951 |